United States Patent
Bareyt

(10) Patent No.: US 10,502,458 B2
(45) Date of Patent: Dec. 10, 2019

(54) SOLAR COLLECTOR INSULATION AND OBTAINED PRODUCT

(71) Applicant: SAINT-GOBAIN ISOVER, Courbevoie (FR)

(72) Inventor: Christophe Bareyt, Saint-Leu d'Esserent (FR)

(73) Assignee: SAINT-GOBAIN ISOVER, Courbevoie (FR)

( * ) Notice: Subject to any disclaimer, the term of this patent is extended or adjusted under 35 U.S.C. 154(b) by 186 days.

(21) Appl. No.: 15/664,406

(22) Filed: Jul. 31, 2017

(65) Prior Publication Data
US 2018/0094836 A1    Apr. 5, 2018

(30) Foreign Application Priority Data

Aug. 1, 2016 (FR) ...................................... 16 57468

(51) Int. Cl.
| F24S 10/00 | (2018.01) |
| F24S 80/65 | (2018.01) |
| F24S 10/40 | (2018.01) |
| F24S 25/00 | (2018.01) |

(52) U.S. Cl.
CPC ............... *F24S 80/65* (2018.05); *F24S 10/40* (2018.05); *F24S 2025/011* (2018.05); *F24S 2025/021* (2018.05)

(58) Field of Classification Search
CPC .. F24S 80/65; F24S 10/40; F24S 10/00; F24S 80/60; F24S 2025/011; F24S 10/44; F24S 2025/021
See application file for complete search history.

(56) References Cited

U.S. PATENT DOCUMENTS

2011/0192393 A1*  8/2011  Swift ...................... F24S 10/72
                                                    126/663

FOREIGN PATENT DOCUMENTS

| EP | 2 302 308 A1 | 3/2011 |
| EP | 2 522 927 A2 | 11/2012 |
| EP | 2 952 826 A1 | 12/2015 |
| WO | WO 2009/026913 A2 | 3/2009 |
| WO | WO 2010/028818 A2 | 3/2010 |

OTHER PUBLICATIONS

French Preliminary Search Report dated Nov. 30, 2016 in French Application 16 57468 filed on Aug. 1, 2016 (with English Translation of Categories of Cited Documents and Written Opinion).

* cited by examiner

*Primary Examiner* — Alfred Basichas
(74) *Attorney, Agent, or Firm* — Oblon, McClelland, Maier & Neustadt, L.L.P.

(57) ABSTRACT

A solar collector, in particular a solar thermal collector, is formed of at least one circuit transporting a heat transfer fluid, and includes at least one insulator, in particular in the form of at least one layer, formed of flakes and/or nodules of mineral wool(s) or mineral fibers. A process is provided for insulating or manufacturing a solar collector into which flakes and/or nodules of mineral wool(s) and/or mineral fibers are blown, as insulator, in particular without adding binder or water.

19 Claims, 2 Drawing Sheets

SOLAR COLLECTOR INSULATION AND OBTAINED PRODUCT

The present invention relates to the field of thermal insulation, and more particularly relates to the insulation of solar collectors. It relates more especially to the insulation of solar thermal collectors containing heat transfer fluid, in particular liquid heat transfer fluid, in particular of glazed flat-plate type in which a heat transfer fluid passes through one or more tubes or coils. It relates both to the solar collector and the insulation/manufacturing process developed.

A solar collector, where appropriate also described as a thermal or heliothermal collector, is a product or device designed to collect the solar energy transmitted by radiation and transmit it in the form of heat to a (liquid, or optionally gaseous) heat transfer fluid. This transmitted heat energy may then be used for heating buildings, for producing hot water or for various other applications (air conditioning, heating of swimming pools, etc.).

There are various types of solar collectors, of more or less complex design and having different performances depending in particular on the envisaged applications. Generally three categories are distinguished: "unglazed" collectors, "glazed flat-plate" collectors and "vacuum tube" collectors.

The unglazed collectors are generally of the simplest structure, for example in form of plastic or metal tubes ("matting collectors"), in which water circulates, these tubes not generally being insulated, this device being especially suitable for applications that do not require high temperatures such as heating of swimming pools. Other unglazed collectors of simple structure are also "selective" collectors that then use a metal absorber, and are also used for water preheating or low-temperature heating.

For glazed flat-plate collectors, that are generally (initially, or once assembled, for example in a building) in the form of housings equipped with a glass pane (or plate based on glass or on certain transparent plastics (or based on transparent polymer(s))) allowing sunlight to enter, the heat-transfer fluid generally passes through a coil or a hydraulic grid placed under an absorbent sheet, an insulator placed in the housing (or frame) and the glass pane used making it possible to reduce the heat losses. These collectors, which may be of various dimensions and the use of which is common, are in particular suitable for producing domestic hot water and for heating buildings.

For vacuum tube collectors, developed in order to improve the performance of flat-plate collectors, the heat transfer fluid generally flows inside a vacuum tube, the vacuum making it possible to improve the insulation, in particular against convection losses when the temperature increases. Vacuum tube collectors make it possible in particular to achieve high temperatures (150° C.) with acceptable efficiencies, but their manufacture remains complex.

Besides the vacuum thus used for the vacuum tube collectors, or the air for the simplest collectors, the insulator conventionally used for insulating solar collectors, in particular inside the housings of glazed flat-plate collectors, consists either of a foam, for example based on melamine or based on polyisocyanurate and/or on polyurethane, or of batts, or plies or mats or felts, of mineral wool, these foams and these batts being easy to source commercially and their temperature behavior being highly valued for a reasonable cost. These foams and batts are generally precut to the appropriate dimensions then inserted, in particular manually, into the structure of the collector, in particular between the hydraulic circuit transporting the heat transfer fluid and the back of the collector, on the side opposite the one that receives the light.

This procedure has a certain number of drawbacks:

it is in particular difficult to obtain a perfectly continuous contact with the insulator over the entire surface of the circuit transporting the heat transfer fluid, this circuit being in particular in the form of small-diameter tube(s) going from one edge to the other of the collector while making, where appropriate, multiple back and forth movements or undulations or loops or turns or switchbacks, or coil(s), the various loops or undulations or turns generally being close together. The contact between the mineral wool batt or the foam and this coiled structure is even lower since the batt or the foam, which is relatively rigid, also has a different profile (flat or undulated differently), in the same way as said batt or said foam generally has a standard thickness that is insufficient (the thickness and the density of the layers of mineral wools used being in particular limited by the capacities of the existing production lines). The degree of filling of the cavity of the collector to be insulated thus generally remains low and leads to a thermal resistance that is also low, the thermal resistance being proportional to the thickness of the insulator.

The installation of these insulators additionally requires the cutting of the insulators and the manual installation thereof, it being possible in particular for these various operations to pose problems for the operator (skin irritation, dust, etc.), in particular in the case of the use of mineral wool batts.

Furthermore, the insulators may be provided with binders for ensuring the mechanical integrity thereof, which in return make the insulator minimally expandable as seen previously and may where appropriate produce undesirable gaseous emissions at high temperature.

The invention has therefore sought to develop an improved solar collector that has in particular a better thermal insulation while remaining easy to manufacture and that has a reasonable cost, and also an improved insulation technique that makes it possible to obtain such a collector, in particular an insulation technique that is simple and convenient for the operator to implement, making it possible to obtain good, in particular improved, insulation performance for the insulation of solar collectors.

This objective has been achieved in the first place by the product or device according to the invention, which is a solar collector, in particular a solar thermal collector, that is to say that it absorbs the solar flux in order to convert it into thermal energy, formed of at least one circuit transporting a heat transfer fluid, characterized in that it comprises at least one insulator, in particular in the form of at least one (insulating) layer, said insulator/said layer being formed of flakes and/or nodules of (or made of) mineral wool(s) or mineral fibers.

In particular, the collector is formed of at least one wall, more specifically of a wall forming the back of the collector, or rear face, as opposed to the face of the collector that receives the light/energy from the sun, or front face, the insulator formed of flakes and/or nodules of mineral wool(s) or mineral fibers being between the circuit transporting the heat transfer fluid and said wall. The insulator/insulator layer may optionally be in direct contact with the circuit transporting the heat transfer fluid, and also with the aforementioned wall, and is preferably in contact with the circuit transporting the heat transfer fluid, in particular in direct contact, that is to say without any intermediate element or sheet or coating.

More specifically, the collector preferentially targeted in the present invention is generally formed of at least one chamber, or housing or frame, that is at least partially rigid (in particular rigid over at least one part of its faces, in particular over its sides), said chamber being made of one or more parts and delimiting in particular the solar collector over its sides (or faces of smaller dimensions or lateral faces between the rear face and the front face) and over one of its faces, in particular the rear face (the corresponding wall of the chamber therefore forming the back of the collector). Said chamber is for example formed of a frame, in particular a metal frame, generally having four sides and being of parallelepipedal shape, in particular rectangular shape, and of a wall (in particular rear wall or back of the collector), generally added onto the frame, that is to say manufactured separately then assembled, this wall being in particular removable relative to the frame, and being inserted into and/or attached to the frame in order to form a housing or box, it being possible for example for this wall to be formed of an aluminum panel or sheet.

More particularly, the collector preferentially targeted in the present invention is of glazed flat-plate type and comprises, besides the aforementioned chamber, at least one glazing unit, in the form of at least one plate of glass, in particular toughened (glass), or of a transparent polymer-based material, this glazing unit forming in particular the front face of the collector and being inserted into and/or attached to the aforementioned frame on the remaining/open face of the chamber. Where appropriate, the glazing unit may have one or more treatments or coatings, in particular an antireflective coating, etc.

The present invention also relates to a process for insulating or manufacturing a solar collector, that makes it possible to obtain the collector according to the invention, wherein flakes and/or nodules of mineral wool(s) and/or mineral fibers are blown (in a gas stream), as insulator, into the collector.

The blowing is carried out in the space or spaces to be insulated, in particular, as mentioned previously, in the space between the circuit transporting the heat transfer fluid and an adjacent wall, in particular the wall forming the back of the collector, or rear face, this blowing being carried out in particular through at least one opening present or made in the chamber of the collector, for example an opening made on one of the sides (or lateral faces between the rear face and the front face) or at the junction between one of the sides and the back of the collector, this opening facing the space to be insulated between the circuit transporting the heat transfer fluid and the adjacent wall. Where appropriate, this opening may be made or provided by perforation or cutting, intended where appropriate to be sealed after filling with the insulator formed of the flakes/nodules, in the side in question, or simply by moving, on one side, the sheet, possibly where appropriate having a certain flexibility relative to the frame, or the plate forming the rear face of the collector, away from the frame forming the sides of the collector, before putting back in place. A single opening is generally sufficient for carrying out the blowing according to the invention. The blowing is carried out by means of a blowing machine connected to a nozzle to be inserted into the opening in question, as described below.

Preferably, the blowing is carried out without addition of (or without adding), during the blowing, binder or water, or in other words free and dry flakes and/or nodules of mineral wool(s) and/or mineral fibers are blown into said space or spaces, as specified below.

The flakes or nodules of mineral wool(s) or mineral fibers used according to the invention are fibers in strands or blends (three-dimensional) or clusters or tufts or rovings or slubs, of fibers, in which the fibers are generally entangled, and not individualized fibers, the flakes (generally having a downy or fluffy appearance) being products conventionally used in the attic spaces of new houses or houses to be renovated in order to form an insulating barrier. In the present invention, they make it possible to fill the entire space between the circuit transporting the heat transfer fluid and an adjacent wall by closely following the contour of said circuit, thus eliminating thermal bridges and improving the thermal resistance obtained, as specified again below.

The flakes or nodules used according to present invention are made of (blown/blowable) mineral wool(s) and/or mineral fibers; use is for example made of flakes made of glass wool (or glass wool in flakes) sold by the companies Saint-Gobain Isover under the brand Comblissimo® or by the company Certainteed under the brand Optima®, or flakes made of rock wool (or rock wool in flakes) sold by the company Saint-Gobain Eurocoustic under the reference "Coatwool HP®".

These flakes or nodules may be produced from mineral fibers formed according to known processes, the fibers possibly then being made into nodules or strands (directly after drawing or subsequently), for example as explained in document FR-A-2 661 687.

They may also be obtained by grinding starting from any material based on mineral wool(s), for example starting from mineral wool felts or batts (in particular having a low content of components that may degrade at high temperature), such as those described in particular in documents EP-A-0 403 347, EP-A-0 819 788, DE-A-39 18 485.

Preferably, the grinding in order to obtain the flakes or nodules, or the choice of the flakes/nodules is carried out/made so that these flakes/nodules have a size of less than 50 mm, preferably less than 30 mm, irrespective of the shape of these flakes/nodules, in particular, for at least 50% (by weight), and preferably at least 75%, of the flakes, between 5 and 25 mm, in order to enable a blowing and a filling that are particularly effective.

The size of a flake or nodule refers to its equivalent diameter, that is to say the diameter of the sphere that would behave in an identical manner during the particle size analysis of the flakes/nodules, the particle size distribution (set of particle sizes) being measured in particular by screening, for example with the aid of an automatic screening device sold under the reference RX-24 by the company Retsch Sieve Shaker, by superposing 4 screens (from the one having the smallest hole size positioned first on the vibrating support up to the one having the largest hole size positioned last, the sizes of holes (squares) successively (starting from the bottom) having sides of 6 mm, 10 mm, 19 mm and 25 mm), the power being set at 65% and the screening time being 5 min for 10 to 12 g of product, the mass of flakes/nodules present in each screen then being weighed. In particular from 30% to 75% by weight of the flakes/nodules used in the present invention have a size of between 10 and 25 mm, and between 5% and 30% by weight of these flakes/nodules have a size of less than 6 mm.

The flakes or nodules are preferably based on fine mineral wool(s) and/or fine mineral fibers for good insulation performance. Particularly advantageously according to the invention, use is made of flakes and/or nodules of (or made of) glass wool(s) (or fibers), with a micronaire preferably of less than 27 l/min, in particular between 3 and 18 l/min, or flakes and/or nodules of rock wool(s) (or fibers), with a fasonaire preferably of greater than 150 mmcw and less than 350 mmcw (millimeters of a column of water), in particular between 200 and 350 mmcw.

The fineness of the glass fibers is often determined by the value of their micronaire (F) under 5 g. The measurement of the micronaire, also referred to as "fineness index", takes into account the specific surface area by means of measuring the aerodynamic pressure drop when a given quantity of fibers is subjected to a given pressure of a gas—in general air or nitrogen. This measurement is standard practice in mineral fiber production units; it is carried out according to the DIN 53941 or ASTM D 1448 standard and uses what is called a "micronaire apparatus".

However, such an apparatus has a measurement limit when the fibers used are fine. For very fine fibers, it is possible and preferable to measure the fineness (or the "micronaire") in l/min using a known technique described in patent application WO 2003/098209. This patent application relates to a device for determining the fineness index of fibers, comprising a device for measuring the fineness index, said measurement device being provided with at least a first orifice connected to a measurement cell suitable for receiving a sample consisting of a plurality of fibers (in the present case a sample of the flakes or nodules), and with a second orifice connected to a device for measuring a differential pressure on either side of said sample, said differential pressure measurement device being intended to be connected to a fluid flow production device, the measurement device additionally comprising at least one volume flowmeter for the fluid passing through said cell. This device gives correspondences between "micronaire" values and liters per minute (l/min).

The fasonaire is, for its part, determined in the following manner: a test specimen (5 g) formed by a tuft of mineral wool (in the present case a sample of the flakes or nodules) free of oil and of binder but that may comprise non-fibrous components (slug) is weighed. This test specimen is compressed in a given volume and is passed through by a stream of gas (dry air or nitrogen) maintained at constant flow rate. The fasonaire measurement is then the pressure drop across the test specimen, evaluated by a graduated column of water in conventional units. Conventionally, a fasonaire result is the average of the pressure drops observed for 10 test specimens, the measurement being expressed in millimeters of a column of water (mmcw).

Besides the flakes and/or nodules, the insulator or the insulating layer within the collector, or the flow blown in order to obtain said insulator/said layer, may also comprise other compounds, in particular solid compounds, in particular other types of insulators, in order to further improve the insulation performance or other performance (improvement of the fire resistant properties for example).

In particular and advantageously, the insulator, or the material blown in order to obtain the insulator, may also comprise aerogels, preferably present and/or blown in particulate form, or form of small portions or particles or beads. These compounds, where appropriate of smaller size than the flakes and nodules used according to the invention, may also help to improve the insulation obtained by, where appropriate, filling in the interstices left by the flakes or nodules. Aerogels are generally more efficient insulators but are expensive, and may in particular be in the form of translucent granules or fine powder. The blowing of the flakes/nodules in order to form the insulator makes this addition of aerogels possible, the blowing of the aerogels alone on the other hand posing problems, in particular in terms of safety and dust. The aerogels used where appropriate with the flakes or nodules according to the invention are advantageously inorganic aerogels, in particular based on oxides, such as aerogels based on silica, aluminum and/or titanium, and preferably are one or more silica aerogels in the form of particles or granules or beads or powder. Advantageously, the size of the aerogel particles that can be used according to the invention is between 1 and 5 mm, and their content within the insulator or the material sprayed in order to form the insulator preferably does not exceed 60% by weight (the aerogels generally being heavier than the flakes).

The insulator according to the invention, or the material or the flow (of material(s)) that is blown in order to form the insulator, may also where appropriate comprise one or more additives such as antistatic additives, oils, etc. at contents advantageously of less than 1% by weight (for all of the additives).

Where appropriate, the flakes/nodules may act as carriers of these additives or other compounds and thus distribute them homogeneously in the space to be insulated.

The insulator according to the invention, as well as the flakes or nodules of mineral wool(s) or mineral fibers used according to the invention, as well as the flow of material sprayed in order to form the insulator, preferably comprise a content of organic compounds (resulting for example from binder(s) or additives added during the manufacture of the fibers or batts of fibers then converted into flakes or nodules) of less than 4%, in particular of less than 1.5% by weight, and are advantageously free of organic compound(s), making it possible in particular to limit the risks of emission of odors and pollutants (VOCs).

Given the insulation process used, even though the presence of such agents is not excluded, it is in particular not necessary to add anti-dusting agents to the blown flow, the dust generated where appropriate remaining in particular trapped in the present invention in the insulated internal space. The content of anti-dusting agents (like the mineral oils or the antistatic agents) in the insulator or the blown material is thus preferably less an 1% by weight, and advantageously the insulator or the blown material is free of anti-dusting agent(s), making it possible to further limit the risks of emission of odors and pollutants.

In one advantageous embodiment, the insulator formed of the flakes and/or nodules of (or made of) mineral wool(s) or mineral fibers also comprises a binder content, whether it is an organic and/or inorganic binder, of less than 4% by weight, and a water content of less than 2% by weight, the insulator preferably being free of binder(s) and preferably being dry or free of water, the water essentially originating from the moisture in the air as specified below.

The circuit transporting the heat transfer fluid of the collector according to the invention is generally formed by a tube or tubes or coil(s), in particular that is (are) metallic, for example made of copper, generally having a small diameter (for example of the order of 10 to 15 mm in diameter), arranged by forming switchbacks (or sinuosities or meanders; reference is also made to a circuit of ladder or grid type, formed of network(s) or rows of tubes that are generally parallel and connected to one another) ranging from one side to the other of the collector along a plane generally parallel to the front and rear faces of the collector, this circuit or network of tube(s) or coil(s) covering a surface area that generally extends practically from one edge to the other of the collector in each direction. This circuit, which is generally rigid, forms in particular a mat or flat plate having dimensions appropriate for going back into the chamber of the collector, this circuit or mat or flat plate of tube(s) generally being (in particular in the case of a glazed flat-plate collector) in contact with at least one absorber or absorbent surface or absorbent element, i.e. intended to absorb the solar energy, for example in the form of a plate or sheet, in particular that is metallic, for example made of copper, which is covered where appropriate for a better efficiency with a coating, for example a "selective" coating, such as a nickel oxide or chromium oxide coating, or which is treated, this absorber being, where appropriate, bonded or welded to the circuit and the assembly being able to be assembled as one piece in the collector, or this absorber being able to be assembled independently, the absorber being placed in the collector between the circuit and the face of the collector (the glass pane in the case of a glazed flat-plate collector) receiving the light/energy from the sun.

The heat transfer fluid used, even though air is not excluded, is in most cases liquid. It is in particular water, or optionally a phase change fluid or else an oil, the fluid usually being water, this fluid being, where appropriate, mixed with an antifreeze, for example of mono-propylene glycol type.

The fluid, in particular liquid, travels through the circuit (or hydraulic circuit) by making back-and-forth movements due to the coiled shape of the circuit and is heated, in particular in contact with the absorber(s), under the effect of the heat, where appropriate transmitted by the absorber(s), derived from the solar radiation, the thermal energy thus captured not being lost by other transfers to the back of the collector due to the presence of the insulator.

As seen previously, the preceding assembly (circuit, absorber(s) and insulator) is advantageously in a chamber that delimits the collector, or housing or box, made of one or more parts, where appropriate that is watertight or made watertight once the collector is assembled or manufactured, to which chamber a glazing unit or glass pane is in particular fastened. This glazing unit is transparent to sunlight and may be equipped with a coating such as an antireflective coating, in order to trap, where appropriate, the infrared rays once inside, this glazing unit located on the front face also making it possible to reduce the heat losses.

The solar collectors thus formed are in particular in the form of sealed housings or panels of various dimensions, which may then be easily installed, for example as roofing or on the ground or on a roof. The collectors may also be offered as a kit or separate elements to be integrated directly into the architecture of the buildings. The surface areas of these collectors may range from several square meters, for example for individual solar water heaters, or even fewer, to several hundreds of square meters, for example for community installations.

The manufacture of the collectors according to the invention is advantageously carried out by the abovementioned blowing process, the blowing, in or by a gas stream, of the flakes and/or nodules being preferentially carried out dry as indicated hereinbelow, or optionally being able to be carried out wet, that is to say with simultaneous wetting of the flakes and/or nodules by water and/or a binder or simultaneous spraying of binder and/or water followed by drying/hardening of the obtained insulating layer formed. However, although it reduces the drawbacks linked to the direct handling of the mineral wool, the wet technique poses problems of cleaning of the work station, and it is difficult to control the amount of material deposited and in particular the homogeneity of the density of the material applied, the drying also being more expensive in terms of time than that needed for the installation of conventional insulators. Problems of coalescence, of the flakes are also observed, which may lead to a density inhomogeneity at certain locations, the density of flakes obtained generally not exceeding moreover 60 kg/m$^3$, thus limiting the insulation performance obtained.

Preferably, the blowing is thus carried out in the present invention without addition of (or without adding), during the blowing, binder or water, in other words free and dry flakes and/or nodules of mineral wool(s) and/or mineral fibers are blown.

Without addition of binder during the blowing is understood in the preceding definition as meaning without addition during the blowing of substance/compound(s) (in particular in liquid or even solid form) suitable for binding the blown flakes/nodules to one another. As indicated below, the presence of a compound conventionally described as "binder" but not capable of binding the flakes/nodules to one another, for example a compound or binder that has already reacted, in particular in the flakes/nodules used for the blowing, is not however excluded. Preferably however, the flakes/nodules inserted into the blowing device are free of binder(s) (even already reacted binder(s)), in the same way as the flow of material blown, as specified again below.

The blowing of the flakes and/or nodules according to the invention is therefore preferentially carried out without deliberate addition of binder (having the ability to bind said flakes/nodules) or water, the flakes and/or nodules blown into the space to be insulated therefore being "free" or separable or not bound together by a binder, and said flakes/nodules also being dry, that is to say with no water added in particular during the blowing, with possible moisture content (or possible water content), in said flakes/nodules, and also in the flow of material sprayed, of less than 2% by weight, in particular less than 1% by weight, relative to the weight of the material blown by the blowing gas stream, the moisture from the ambient air, indeed, being able in particular to be absorbed into the blown material.

This blowing may in particular be described as "dry" blowing or blowing that is carried out "dry" or "via a dry process", with no added medium (in particular liquid medium) of water or (organic or inorganic) binder type, the entire flow (or all the material) sprayed (formed at least of the flakes or nodules but that may also comprise additional compounds such as aerogels or additives, as already indicated) advantageously being free of added water and binder. The term "added" is understood to mean added during the insulating process in the spraying/blowing device used for depositing the insulator/insulating layer, on the flakes or nodules before they reach the part to be insulated and/or into the blowing gas stream (through the same feed as the flakes or nodules or through another feed), knowing that, as already mentioned, the flakes or nodules may for their part already comprise a binder before they are blown, in particular a binder derived from their manufacturing process and that may be present at contents preferentially of less than 4% by weight of dry binder relative to the weight of said flakes or nodules (as introduced into the blowing device), this binder being in this case incapable of binding them together during the blowing or in the product obtained since it is in particular already polymerized or crosslinked or cured or hardened or has already reacted. Other materials or substances may, where appropriate, be added during the blowing as long as in particular there are no binders or water, in particular other solid insulators, or additives in small proportions, as indicated below.

The flow of material (formed of solid components and optionally liquid components) blown into the collector may thus comprise, in this (dry process) embodiment, besides the flakes and/or nodules of mineral wool(s) and/or mineral fibers:

less than 2%, preferably less than 1%, by weight (relative to the weight of the material blown by the blowing gas stream) of moisture/water, essentially originating from the ambient air (by hygroscopic equilibrium), optionally less than 4% of binder lacking the ability to bind (or incapable of binding) the flakes and/or nodules together, originating essentially from the process for manufacturing the flakes and/or nodules and that is already on and/or in the flakes introduced into the blowing device, this binder being already polymerized or cross-linked or cured or hardened or having already reacted, optionally one or more other components as long as this does not include binder(s) still capable of binding the flakes/nodules together and as long as this does not include water-containing component(s) (this (these) component(s) therefore being free of water), in particular:

one or more additional insulating materials, in particular in the form of particles, in particular aerogels, one or more additives, in a small proportion, in particular at less than 1% by weight (relative to the weight of the material blown by the blowing gas stream), and preferably at less than 0.5% by weight, for example one or more additives of mineral oil, antistatic, silicone, etc. type.

The flow (or the material) blown (or sprayed) is thus advantageously essentially (preferably to at least 98% by weight of the sprayed material forming the insulating layer, and up to 100% by weight) formed of dry material (also predominantly, or essentially, solid or formed, or constituted, of solid particles), formed in particular of the aforementioned flakes and/or nodules, transported by the gas stream, and that fill the space to be insulated in order to form a thermally insulating barrier (in the form of at least one insulating layer). One or more liquid components, in particular one or more additives, may where appropriate be present, for example one or more mineral oils, the content of these liquid components or additives preferably being less than 1% by weight, as seen previously, in particular less than 0.5% by weight, relative to the weight of sprayed material, this content preferably being zero, the gas stream preferentially spraying only solid particles, advantageously formed for the most part (to at least 95% by weight) or even solely, of insulating materials, said insulating materials comprising at least the aforementioned flakes or nodules of mineral wool(s) and/or mineral fibers.

Although it is not excluded in the present invention for the flakes or nodules used to already incorporate an (already reacted) organic or inorganic binder, derived in particular from their manufacturing process, the content of this binder advantageously does not exceed 4% by weight as indicated previously, this optionally present binder preferably being inorganic or mineral. Preferably, the flakes or nodules used are chosen to be free of binder, in the same way as they are free of water (the optional residual water originating where appropriate from the ambient moisture).

The present invention also relates to a blowing device particularly suitable for the implementation of the process according to the invention, as described below.

The structure of the flakes or nodules and the blowing according to the invention into the space to be insulated, in particular into the space, or cavity or part, between the circuit for transporting the heat transfer fluid and the rear or back of the collector, make it possible to obtain an insulating layer having dimensions adapted to this space, the flakes/nodules encapsulating in particular the circuit or coil(s) in which the fluid flows and also making it possible to well insulate the edges of the cavity (avoiding the use of insulating foam on the frame or the uprights of the collector and in particular simplifying the installation), thus making it possible to eliminate the problems of thermal bridges and to improve the insulation performance obtained. In addition, the possible coupling with other insulators, such as aerogels, makes it possible to further improve the performance, in particular thermal performance, or even other performance, for example acoustic or fire-resistant performance, of the insulation.

The use of the flakes or nodules, in particular which are free and dry, and the blowing carried out, also make it possible to avoid the technical limits of the production lines for insulators of foam or mineral wool batt type, and make it possible in particular to obtain, if needed, layers of insulators of much greater densities than those obtained with pre-existing processes, or where appropriate than those obtained via a wet process, the preferred dry process and device making it possible in particular to work at higher pressure, the flakes or nodules being distributed into all the nooks of the cavity to be insulated without risks of coalescence.

The use of the flakes or nodules, in particular which are free and dry, and the blowing carried out, also make it possible to avoid any step of drying or treating the insulator once deposited and for all that do not have either, even in the absence of binder or water or anti-dusting agent, problems linked to dust fly-off (the insulator being trapped in a closed space); the process is consequently rapid and does not require an interruption of the production line, likewise it has few risks linked to the handling of mineral fibers. It also makes it possible to preserve the cleanliness of the collector and of its front face, and thus a better effectiveness of the collector.

Furthermore, the absence, preferably, of binder or water surprisingly does not adversely affect the properties of the insulator obtained and it is not necessary either to bind the flakes or nodules by another treatment, likewise it also proves unnecessary to add anti-dusting agents, consequently eliminating any risk of emission of odors or of air pollutants generated by these types of agents or binders during the operation of the collector, likewise this makes it possible to avoid any degassing or fog phenomenon that may soil the collector, in particular its front face or its glazed part, and hamper its effectiveness (by decreasing in particular the transmittance of said glazed part and thus the efficiency of the collector).

The flakes or nodules of mineral wool(s) or mineral fibers and the other optional components of the blown material are delivered and introduced into the space to be insulated by means of blowing device(s) comprising at least one diffuser (or injector or nozzle) and at least one inlet duct/channel, connected to a blowing machine. Via this introduction, the risks of dust fly-off are reduced or even eliminated, thus making the work station more pleasant for the operator and less expensive in terms of maintenance. The introduction into an internal space delimited by one or more walls makes it possible to define the shape of the insulating layer at the very moment when it is applied in the internal space to be insulated while controlling its thickness, the deposited layer then being protected by said walls or in said internal space.

Where appropriate, certain outlets may be present in the walls delimiting the space to be insulated, for example in the form of hole(s) drilled in the lateral walls or the frame of the collector, these holes or opening being in particular of smaller size than that of the flakes or nodules or other insulators present where appropriate, or else being provided with filter(s) (such as a glass web) in order to stop the insulators while allowing the gas through, in order to enable a better evacuation of the blowing gas and to prevent areas of accumulation of the insulators. The blowing gas used is preferably air.

The process according to the invention makes it possible to obtain insulating layers that already have their final shape, without requiring additional shaping, the dry process blowing also making it possible to use blowing flow rates of greater than those used/reached by a dry process. Use is in particular made of blowing flow rates that may reach 200 g/s, in particular of the order of 50 to 200 g/s, the density obtained for the insulating layer itself possibly ranging up to 100 or 120 kg/m$^3$, the density obtained in particular possibly being between 10 and 100 kg/m$^3$, in particular between 25 and 80 kg/m$^3$ in a dry process, this density preferably being greater than 25 kg/m$^3$. The blowing gas pressure may itself reach 500 mbar, and is generally between 70 and 250 mbar, depending on the volume to be filled and the desired density.

Preferably, in the process according to the invention, the blowing gas stream is oriented substantially parallel to the mid-plane of the space to be insulated, in particular parallel to the front and/or rear faces of the collector, with an angle between the blowing stream (or blown flow) and the plane or the surface considered of between +5° and −5°, in order to obtain a homogeneous and, where appropriate, sufficiently dense filling, and in order also to prevent the return of flakes/nodules to the blowing nozzle, which may optionally block the latter.

The material blown into the space may be blown from a fixed point, in particular a lateral opening as mentioned previously, or optionally from a mobile point (the nozzle moving for example in translation along the space to be insulated) so that the filling of the cavity is carried out gradually from one end of the cavity to the other.

The present invention also relates to a blowing device particularly suitable for the implementation of the process according to the invention.

The blowing device used comprises in particular at least one diffuser (or injector or nozzle) having an outlet area capable of fitting (or slotting) into at least one portion or the whole of an opening that opens onto the internal space to be insulated so that the flow leaving the diffuser is essentially parallel (or tangent) to the mid-plane of said space (or else mid-plane relative to the lateral walls of said space).

The expression "essentially parallel" is understood to mean parallel to the plane in question, with a tolerance of the angle between the blowing stream (or blown flow or flow leaving the device) and the plane in question of between +5° and −5°.

The device may also comprise a least one mixer (or mixing member or system or means). The mixer is in particular a sleeve of appropriate shape that makes it possible, depending on the case, to homogenize the flow rate of flakes/nodules in the cross section of the duct delivering said flakes/nodules from the blowing machine to the diffuser. The mixer also makes it possible to homogenize the various components of the flow (for example the flakes and aerogels). This mixer, the internal relief of which is for example chosen to enable the mixing of the components and the orientation of the flow, is in particular a "static" or "convergent" mixer.

The diffuser may be capable of inserting or fitting into the whole of/over the entire surface area or cross section of an opening of the space to be insulated, for example an opening made on one of the sides of the collector, in particular in one of these smaller sides, or may be capable of inserting into one portion only of said opening (preferably a large portion, in particular may occupy at least 50% of the surface area of said opening), and may be capable of sliding along the space in question in particular so that the filling of the space is carried out gradually by movement (for example in translation) of the diffuser in said space. The diffuser may also, where appropriate, be stationary. The opening, just like the flow area or outlet area of the diffuser, may be relatively large (for example several tens of cm wide, for example 50 cm) in order to immediately cover a large cross section of the space to be insulated (the height of the opening and/or of the flow area or outlet area of the diffuser being for its part preferentially limited to several centimeters, for example of the order of 3 cm), or where appropriate the diffuser may be placed in a small-diameter opening made or provided for this purpose in an outer wall of the collector opposite the space to be insulated (for example the opening and/or the flow area or outlet area of the diffuser may have a diameter of less than 50 or 30 mm), this procedure being advantageous in particular when it is a question of redoing the insulation of an already manufactured collector.

The diffuser may in particular be flat (or have a flat, in particular rectangular, flow area or outlet area), or it may have a round or oval flow area, for example when it is intended to be placed in a small-diameter opening made or provided in an outer wall of the collector.

Preferably, the diffusers used have a height (in the case of flat diffusers) or an internal diameter (in the case of diffusers with a round cross section) of the channel (or flow area of the flakes/nodules) of between 12 and 45 mm. In the case of diffusers with an oval cross section, the smallest axis of the cross section of the channel also preferentially has a length of between 12 and 45 mm.

Besides the diffuser(s) and where appropriate the mixer(s), the blowing device according to the invention may also comprise other components, for example one or more handles or another system for handling the diffusers. It additionally comprises or is connected to a blowing machine, for example a blowing machine such as the ones sold under the references Fibermaster MK700, 750 or 1000 by the company Steward Energy, or under the references ISO 400 or ISO 300 by the company Isol France, or under the references X-Floc Zellofant M95, or EM320 or 325 (by the company X-Floc), or under the reference Volu-matic by the company Certainteed MachineWorks.

Other features and advantages of the invention will become apparent on reading the following examples that illustrate the invention without however limiting it, by presenting the results obtained for thermally insulated collectors according to the present invention in comparison with a reference example relating to collectors of the same structure with the exception of the insulator, the insulation being achieved in the reference example by inserting a conventional solar collector insulator.

The manufacture of the collectors according to the present invention is simultaneously illustrated, in a nonlimiting manner, in the appended drawings, in which.

Figure 1A:
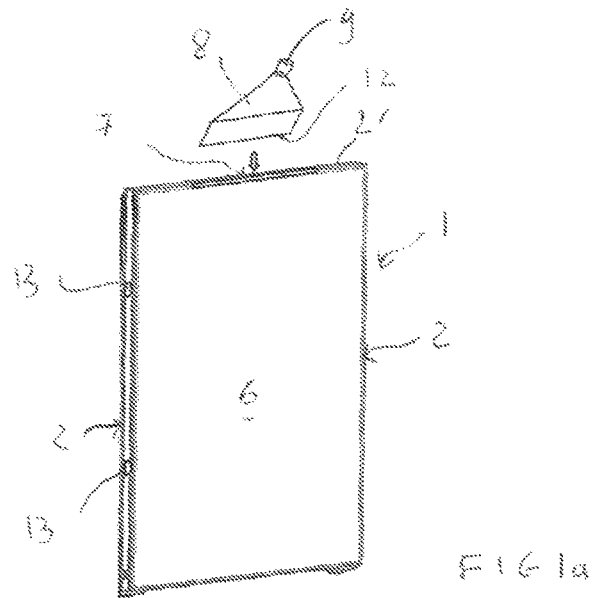
FIG. 1a represents a schematic partial view of a solar collector and of a portion of a blowing device according to the invention which are positioned in preparation for carrying out the blowing of the flakes/nodules of mineral wool(s)/fibers in order to obtain a solar collector according to the invention.
Figure 1B:
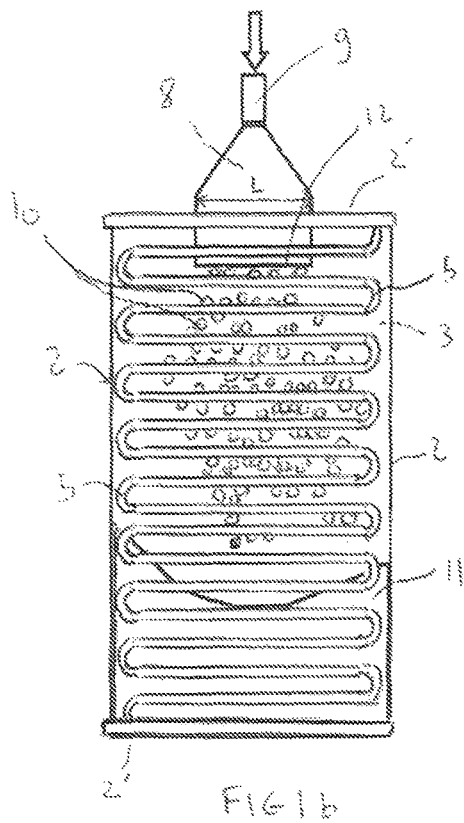
FIG. 1b represents a view of the inside of the assembly from FIG. 1a during the blowing.
Figure 2A:
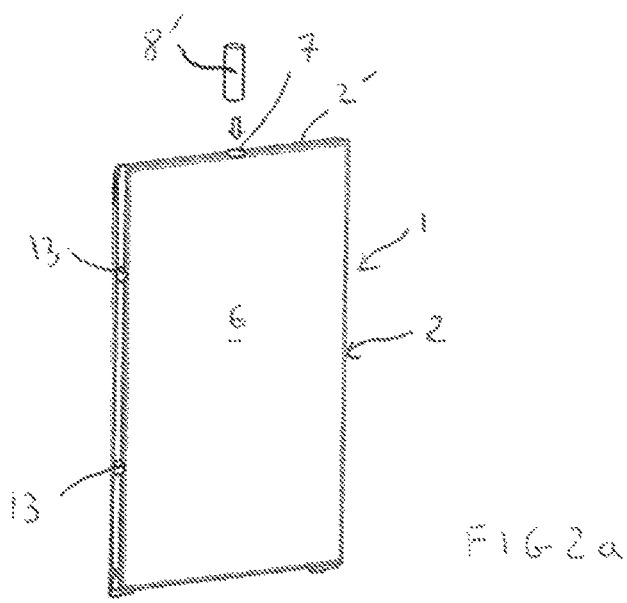
Figure 2B:
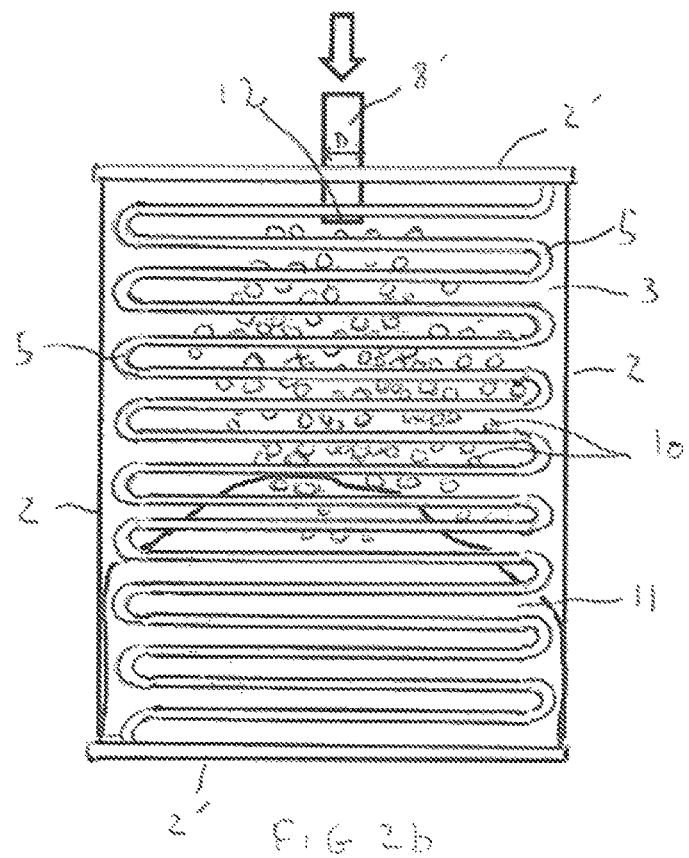

FIGS. 2a and 2b represents figures similar to FIGS. 1a and 1b but with a blowing device that has a diffuser with a cross section different to the one illustrated in FIGS. 1a and 1b.

Example 1 According to the Invention

Figure 1C:
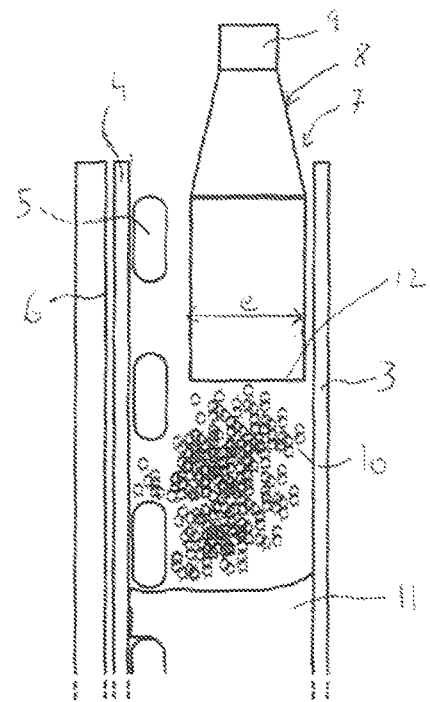
FIG. 1c represents, seen from the side with respect to the previous figures, the inside of the assembly from FIG. 1a during the blowing.

In this example, the collector (1) is formed of a chamber comprising a metal frame (2) formed of extruded and bent aluminum profiles, added to which frame is a back (3) in the form of a metal sheet, for example made of aluminum or aluminum-zinc, the assembly being held by clinching in order to form said chamber, an absorber (4) (cf. FIG. 1c) formed of a copper sheet provided with a selective corrosion-resistant coating is additionally fastened inside the chamber, with the aid of rubber sleeves (for example of EPDM or silicone type, these sleeves not being represented in the figures) mounted in the aluminum frame, this absorber additionally being attached, in particular by laser welding, to a hydraulic circuit (5) (of coil or ladder or grid type) made of copper intended to transport water, the hydraulic circuit facing the back of the chamber and the absorber facing a glass plate (6) that seals the collector on its opposite face (face opposite the one formed by the back), the glass plate (not represented, like the absorber, in FIG. 1b or 2b, for a better understanding, said glass plate covering the absorber that itself covers the hydraulic circuit as illustrated in FIG. 1c) being in particular a 3 mm thick plate of tempered solar glass with a low iron content and being for example fastened to the chamber with the aid of adhesives, the leaktightness between the glazing unit and the chamber being provided for example by a seal (for example made of EPDM, not represented). Starting from the back of the collector (3), there is therefore successively (before addition of the insulator) the hydraulic circuit (5), the absorber (4) and the glass pane (6), the space left between the back and the circuit having a thickness of around 50 mm.

The insulation is achieved as follows according to the invention:

The collector is fastened to a support, for example a vertical support (as illustrated in the figures, the support not being represented), and introduced between the rear plate and the hydraulic circuit/absorber assembly, on one of the small sides (2') of the frame (then directed upwards in the case of the vertically fastened collector), through an opening (7) made that gives access to the space or portion of the collector to be insulated between the rear plate and the coil, is a flat diffuser (8) with a rectangular cross section (for example an outlet area having a width (L) of 50 cm (FIG. 1b) and a depth (e) of 50 m (FIG. 1c), the scale not necessarily being respected in the drawings, in particular FIG. 1c being enlarged for better understanding) or a diffuser with a round cross section (8') or oval cross section (for example having an outlet area with a diameter (D) of 20 mm (FIG. 2b)) of a blowing device, connected, for example by means of a connection sleeve (9) to a blowing machine (not represented) of Fibermaster MK500 reference sold by the company Stewart Energy. The diffuser that can be fitted in is preferentially oriented parallel to the glass plate and to the back of the collector, a single diffuser being sufficient to carry out the desired insulation. In an alternative embodiment, the blowing, in particular in the case of the use of a diffuser with a round cross section, may also be carried out through an opening made in the back (3) or rear of the collector.

The blowing machine comprises a supply of mineral wool flakes, "decaking" members intended to separate the flakes that are usually sold in sacks or compacted bales, one or more flake-conveying members (or ducts), and a blower which directs a stream of pressurized air into the duct or ducts.

The dry blowing of the flakes/nodules of mineral wool(s)/fibers (10) between the back of the collector and the hydraulic circuit/absorber assembly is carried out until the cavity between said back and said assembly is filled (the flakes also filling in the empty spaces between the undulations of the coil and the absorber), an automatic pressure cutoff occurring for example when the column of flakes (11) reaches the end piece (12) of the diffuser in order to stop the blowing, holes (13) (for example having a diameter of around 10 mm) having additionally been drilled through the uprights of the frame in order to enable the evacuation of the air. All of the holes made through the chamber of the collector (for the blowing and the evacuation of the air) may then be plugged by plugs or pellets made of rubber or silicone or polyamide, etc.

The blowing flow rate used is of the order of 120 g/s, the pressure at the diffuser being close to 200 mbar during the blowing. The distribution of the flakes is carried out homogeneously, the density and the thickness of the layer that are obtained respectively being of the order of 35 kg/m$^3$ and 50 mm, the flakes used being blowable glass wool flakes sold by the company Saint-Gobain Isover under the brand Comblissimo® having a micronaire of 6 l/min, the thermal conductivity value $\lambda$ (measured in particular according to the EN12667 standard) obtained being of the order of 35 mW·m$^{-1}$K$^{-1}$ for the aforementioned density of 35 kg/m$^3$, the content of binder and of organic components in these flakes (originating from their manufacture, the blowing being carried out by the dry process) being less than 2%. The thermal resistance R obtained, corresponding to the ratio of the thickness of the insulator to the thermal conductivity $\lambda$, is 1.4 m$^2$·K/W.

The energy loss from the collector is additionally evaluated by determining the value of the first order loss coefficient a1 in the following manner: the power delivered by the solar collector is given by the following relationship: P=q*ρ*Cp*(Ts−Te), in which q is the flow rate of water passing through the hydraulic circuit (here of the order of 43 l/h·m$^2$), ρ is the density of the water (set at 1000 kg/m$^3$), Cp is the specific heat capacity of the water (here equal to 4186 J·kg$^{-1}$·K$^{-1}$), Te is the temperature of the water at the inlet of the collector and Ts is the temperature of the water at the outlet of the collector. The efficiency of the collector η=(power delivered by the collector)/(solar flux received by the absorber), is measured for various ΔT values, where ΔT is the difference between the average temperature of the heat transfer fluid in the collector and the external ambient temperature, the measurements being made after 5 h of exposure under incident radiation Eo. Moreover, in accordance with the EN12975 standard, the experimental curve of the efficiency η may be modelled by an equation of the type: η=F×τ×α−a1×(ΔT/Eo)−a2×(ΔT$^2$/Eo), in which F is the collector efficiency factor, τ is the transmission factor of the glazing unit, α is the absorption factor of the absorber and Eo is the incident solar radiation (after 5 h of exposure). For simplification, the coefficient F*τ*α (optical efficiency of the collector) is taken as equal to 0.8. Moreover Eo=800 W·m$^2$ with a direct incidence of the luminous flux (the solar flux is measured by a sensor having the same inclination as the collector). The experimental efficiency curve is in the form of a curve which is a function of ΔT, of ordinate at the origin F*τ*α (case where ΔT=0). The equation of the curve η=f(ΔT) according to the preceding equation is determined by linear regression, by varying the factors a1 (determining the slope of the curve) and a2 (determining the inflection of the slope of the curve), until the modelled curve and the experimental curve are superimposed. The superimposing of the two sets the coefficients a1 and a2, which are respectively the $1^{st}$ and $2^{nd}$ order loss coefficients.

The first order loss coefficient a1 obtained is 3.12 $W/m^2 \cdot K$.

Moreover, the product obtained is classified A1 in terms of fire resistance (according to the DIN 4102 standard).

Example 2 According to the Invention

The procedure of the preceding example is followed, replacing the blowable glass wool flakes with rock wool flakes sold by the company Saint-Gobain Eurocoustic under the reference "Coatwool HP®" and having a fasonaire of 250 mmcw The results obtained are the following: blown density of 45 $kg/m^3$; layer thickness of 50 mm (thickness of the cavity as in the previous example); thermal conductivity λ of the order of 45 $mW \cdot m^{-1} K^{-1}$; thermal resistance R of 1 $m^2 \cdot K/W$; first order loss coefficient a1 of 3.34 $W/m^2 \cdot K$; and classification A1 in terms of fire resistance.

Reference Example

Instead of blowing the insulating layer as in each of the preceding examples, a melamine foam sold by the company BASF under the reference Basotec is inserted between the back and the coil, this foam being, conventionally used for insulating solar collectors, this foam, with a thickness of 20 mm and a density of 12 $kg/m^3$, having an undulating profile in order to occupy a larger space between the back and the hydraulic circuit/absorber assembly, the thermal conductivity λ obtained being of the order of 33 $mW \cdot m^{-1} K^{-1}$, an additional mineral wool being desirable in order to ensure the insulation of the back of the collector, the melamine foam not filling all the space between the back of the collector and the hydraulic circuit/absorber assembly. The thermal resistance R obtained is this time 0.6 $m^2 \cdot K/W$, the first order loss coefficient a1 being 3.92 $W/m^2 \cdot K$, the insulation performance obtained consequently being worse than in the examples according to the invention.

The classification in terms of fire resistance is moreover much worse (class C).

In the case of the collectors obtained according to the invention, a better leaktightness and an improvement in the thermal performance are thus observed, the insulation also being achieved in a practical manner without dust. Where appropriate, the thermal performance may be further improved by adding aerogels to the flakes, for example granules of aerogels of reference P300 sold by the company Cabot, in a proportion for example of 30% to 60% by weight of the blown material.

The present invention makes it possible to produce a new range of solar collectors that have improved insulation and performance, these collectors possibly being used as solar water heaters (domestic hot water, heating of buildings, either individual or community, etc.), or other applications (heating of swimming pools, of floors air conditioning, etc.).

The invention claimed is:

1. A solar thermal collector comprising:
   a frame having at least one wall forming a back of the collector;
   at least one circuit configured to transport a heat transfer fluid; and
   at least one insulator in the form of at least one layer, formed of flakes and/or nodules of one or more mineral wools or mineral fibers,
   wherein the at least one insulator formed of flakes and/or nodules of one or more mineral wools or mineral fibers is between the circuit transporting the heat transfer fluid and said back wall, and is in contact with the circuit transporting the heat transfer fluid.

2. The solar collector according to claim 1, wherein the collector is a glazed flat-plate collector and comprises at least one glazing unit.

3. The solar collector according to claim 1, wherein the flakes and/or nodules have a size of less than 50 mm, for at least 50% by weight of the flakes, between 5 and 25 mm.

4. The solar collector according to claim 3, wherein the flakes and/or nodules have a size of less than 30 mm.

5. The solar collector according to claim 1, wherein the flakes and/or nodules are made of one or more glass wools or glass fibers, with a micronaire of less than 25 l/min, and/or are made of one or more rock wools or rock fibers, with a fasonaire of greater than 150 mmcw.

6. The solar collector according to claim 5, wherein the flakes and/or nodules have a micronaire between 3 and 18 l/min, and a fasonaire between 200 and 350 mmcw.

7. The solar collector according to claim 1, wherein the insulator further comprises aerogels.

8. The solar collector according to claim 1, wherein the insulator comprises a content of organic compounds of less than 4% by weight, and is free of one or more organic compounds, and the insulator comprises a content of anti-dusting agents of less than 1% by weight, and is free of one or more anti-dusting agents.

9. The solar collector according to claim 8, wherein a content of organic compounds is less than 1.5% by weight.

10. The solar collector according to claim 1, wherein the insulator comprises a binder content of less than 4% by weight, and a water content of less than 2% by weight, the insulator being free of one or more binders.

11. The solar collector according to claim 1, wherein the density of the insulator is between 10 and 100 $kg/m^3$.

12. The solar collector according to claim 11, wherein the density of the insulator is between 25 and 80 $kg/m^3$.

13. A process for insulating or manufacturing a solar collector for obtaining the collector according to claim 1, wherein the flakes and/or nodules of one or more mineral wools and/or mineral fibers are blown, as insulator, into the collector.

14. A process according to claim 13, wherein the blowing is carried out without adding binder or water.

15. A process according to claim 13, wherein a flow of blown material comprises, besides the flakes and/or nodules of one or more mineral wools and/or mineral fibers:
   less than 2% by weight of moisture,
   one or more additional insulating materials,
   one or more additives, at less than 1% by weight, for example one or more additives of mineral oil, antistatic and silicone.

16. The process according to claim 15, wherein the flow of blown material further comprises:
   less than 4% of binder already polymerized or crosslinked or cured or hardened or that has already reacted; and one or more other components incapable of binding the flakes/nodules together and free of water.

17. A process according to claim 13, wherein the flakes and/or nodules have less than 4% by weight of binder, and in that a content of anti-dusting agents in the blown material is less than 1% by weight, the blown material being free of one or more anti-dusting agents.

18. A process according to claim 13, wherein a blowing gas stream is oriented substantially parallel to a mid-plane of a space to be insulated, with an angle of incidence of the blowing stream with said plane of between +5° and −5°, a blowing flow rate additionally being of the order of 50 to 200 g/s, and/or a blowing gas pressure being between 70 and 500 mbar.

19. A blowing device for the implementation of the process according to claim 13, and suitable for insulation of solar collectors, comprising at least one diffuser having an outlet area capable of fitting into at least one portion of an opening that opens onto a space to be insulated, so that a flow leaving the at least one diffuser is essentially parallel to a mid-plane of the space to be insulated.

\* \* \* \* \*